United States Patent
Choi et al.

(10) Patent No.: US 9,904,708 B2
(45) Date of Patent: Feb. 27, 2018

(54) APPARATUS AND METHOD FOR PROCESSING QUERY IN DATABASE WITH HYBRID STORAGE

(71) Applicant: TmaxData Co., Ltd., Gyeonggi-do (KR)

(72) Inventors: Youngjae Choi, Gyeonggi-do (KR); Sangyoung Park, Gyeonggi-do (KR); Sungwook Moon, Gyeonggi-do (KR); Sehoon Seo, Gyeonggi-do (KR)

(73) Assignee: TMAXDATA CO., LTD., Gyeonggi-do (KR)

( * ) Notice: Subject to any disclaimer, the term of this patent is extended or adjusted under 35 U.S.C. 154(b) by 388 days.

(21) Appl. No.: 14/626,429

(22) Filed: Feb. 19, 2015

(65) Prior Publication Data

US 2015/0234898 A1 Aug. 20, 2015

(30) Foreign Application Priority Data

Feb. 20, 2014 (KR) .................. 10-2014-0019730

(51) Int. Cl.
*G06F 7/00* (2006.01)
*G06F 17/30* (2006.01)

(52) U.S. Cl.
CPC ............... *G06F 17/30463* (2013.01)

(58) Field of Classification Search
CPC .............................................. G06F 17/30463
See application file for complete search history.

(56) References Cited

U.S. PATENT DOCUMENTS

| 6,915,307 B1* | 7/2005 | Mattis ............... G06F 17/30067 |
| 2012/0215752 A1* | 8/2012 | Parkkinen ......... G06F 17/30312 707/705 |
| 2013/0232176 A1* | 9/2013 | Plattner ............. G06F 17/30289 707/803 |

FOREIGN PATENT DOCUMENTS

| JP | 2012-247901 A | 12/2012 |
| KR | 10-2009-0054424 | 5/2009 |
| KR | 10-2009-0113499 A | 11/2009 |

OTHER PUBLICATIONS

Korean Office Action dated Feb. 27, 2015 issued in corresponding Korean application No. 10-2014-0019730.

* cited by examiner

*Primary Examiner* — Tuan A Pham
(74) *Attorney, Agent, or Firm* — Martin & Ferraro, LLP

(57) ABSTRACT

The present invention provides an apparatus and method for processing a query in a relational database system having a hybrid storage of a memory tablespace and a disk tablespace, with the configuration of the present invention, by extending a table partitioning technology in order for the relational database system to use the disk tablespace and memory tablespace in a hybrid manner, it is possible to implement data discrimination due to different data storages in one logical table and create scan plans in compliance with the difference in the storages, thereby establishing an optimal scan plan to the query intended to access the storages having different properties.

11 Claims, 8 Drawing Sheets

FIG.3

TABLESPACE DISK_TBS

| 2012/10/10 | 1 | 32 | DELIVERED | 40,000 |
|---|---|---|---|---|
| 2012/11/13 | 2 | 9123 | DELIVERED | 100,000 |
| 2012/12/01 | 3 | 4923 | CANCELED | 30,000 |
| 1012/12/28 | 4 | 5831 | DELIVERED | 80000 |

OPDERS_P1(300)

| 2013/01/01 | 5 | 1493 | DELIVERED | 110,000 |
|---|---|---|---|---|
| 2013/01/01 | 6 | 931 | DELIVERED | 1,000 |
| 2013/01/14 | 7 | 291 | CANCELED | 103,000 |
| 2013/01/28 | 8 | 32 | DELIVERED | 20,000 |

OPDERS_P2(302)

| 2013/02/04 | 9 | 1292 | DELIVERED | 9,900 |
|---|---|---|---|---|
| 2013/02/06 | 10 | 913 | DELIVERED | 100,500 |
| 2013/02/09 | 11 | 95 | DELIVERED | 30,000 |
| 2013/02/11 | 12 | 9991 | DELIVERED | 80,000 |

OPDERS_P3(304)

FIG. 4A

TABLESPACE MEMORY_TBS

| 9123 | 2012/10/10 | VIP | GUMI-DONG | GIILDONG HONG |
|------|------------|-----|-----------|---------------|
| 931  | 2013/01/01 | VIP | DOGOK-DONG | GIILDONG KIM |
| 32   | 2013/02/11 | VIP | JONGRO | GIILDONG LEE |
| 9991 | 2010/05/09 | VIP | CHEONGDAM-DONG | GIILDONG KNAG |
| CUST_P1(400) ||||||

FIG. 4B

TABLESPACE DISK_TBS1

| 123 | 2011/01/10 | GOLD | SEOHYUN-DONG | GIILDONG HONG |
|-----|------------|------|--------------|---------------|
| 621 | 2013/01/11 | GOLD | DAECHI-DONG | GIILDONG KIM |
| 9   | 2011/12/11 | GOLD | DOGOK-DONG | GIILDONG LEE |
| 1   | 2012/11/21 | GOLD | JONGAM-DONG | GIILDONG KNAG |
| CUST_P2(402) ||||||

FIG. 4C

TABLESPACE DISK_TBS2

| 2 | 2011/09/10 | SILVER | JEONGJA-DONG | GIILDONG HONG |
|---|---|---|---|---|
| 321 | 2001/02/11 | SILVER | CHEONGDAM-DONG | GIILDONG KIM |
| 71 | 2013/12/31 | SILVER | KEUMKOK-DONG | GIILDONG LEE |
| 103 | 2002/07/01 | SILVER | SEONGBUK-DONG | GIILDONG KNAG |
| CUST_P3(404) | | | | |

FIG. 4D

TABLESPACE DISK_TBS3

| 5 | 2012/10/10 | . | JONGRO | GIILDONG HONG |
|---|---|---|---|---|
| 88 | 2011/11/21 | . | SEOHYUN-DONG | GIILDONG KIM |
| 33 | 2013/12/11 | . | CHEONGDAM-DONG | GIILDONG LEE |
| 4122 | 2011/05/29 | . | GUMI-DONG | GIILDONG KNAG |
| CUST_P4(406) | | | | |

APPARATUS AND METHOD FOR PROCESSING QUERY IN DATABASE WITH HYBRID STORAGE

RELATED APPLICATIONS

This application is based on and claims priority from Korean Patent Application No. 10-2014-0019730, filed on 20 Feb., 2014, the disclosure of which is incorporated herein in its entirety by reference.

FIELD OF THE INVENTION

The present invention relates to a table partitioning for use in a relational database system, and more particular, to an apparatus and method for processing a query in a relational database system having a hybrid storage of a memory tablespace and a disk tablespace in which a table partitioning technology is extended in order to use the disk tablespace and memory tablespace in a hybrid manner, which is capable of implementing data discrimination due to different data storages in one logical table, creating scan plans in compliance with the difference in the storages to establish an optimal scan plan to the query intended to access the storages having different properties, and enabling an efficient use of a limited storage capacity while gaining a faster response to the query by providing a time-based partitioned table functionality of storing latest data in the memory tablespace and transferring in sequence old data that has passed a certain period of time into the disk tablespace.

BACKGROUND OF THE INVENTION

In recent, relational database systems are widely utilized for storing data in many fields. In a relational database system, same types of data is logically collected and stored in a logical table. Each one of data items constituting the table is referred to as a row and the one row is composed of a plurality of columns.

By the way, as the amount of the table increases that is a collection of data with same logical attributes, there has been proposed a technology that divides a table into several segments with horizontal partitions (or row bundles) and stores them in order for a convenient management. Each one of the table segments that are physically horizontally divided is referred to as a partitioned table. The use of this table partitioning technology with partitioned tables enables a user to designate a physical location of each partitioned table to be placed, thereby giving the distribution of simultaneous accesses to the relevant table.

Meanwhile, in order to cope with the request for a rapid response speed, the relational database system has recently adopted a main memory database to store data in memories rather than disks. When the relational database system uses a memory as the main memory for data storage, performance improvement of 3-10 times can be expected, as compared to a typical disk-based database, in terms of insert, delete, and inquiry operations to the table. However, the database system capable of storing data in memory only is not suitable for storing the large amounts of data owing to the limitation of storage capacity.

The following is a brief description as to structures and properties between a disk-based relational database and a memory-based relational database.

First, to explain the structure and property of the disk-based relational database, the disk-based relational database stores table data in a disk in the form of blocks, reads a data block into an area of a buffer cache of the main memory in response to a query from a user, and performs a data processing on the data block on the main memory.

During the data processing, upon receiving a DML (Data Manipulation Language) request to change data, the data block in the buffer cache is changed on the memory and the change is stored in the disk in advance in the form of a redo log, so that the change that has not yet been reflected in the disk can be recovered without any loss when the server goes down. Furthermore, the undo log for the change is stored in an undo block in order for the overall data in an old version to be viewed.

In addition, the contents that are stored on the disk are updated with latest data in a manner of reflecting dirty data blocks that are changed in the buffer cache to the disk periodically.

However, although the disk-based relational database puts frequently used disk data blocks on the buffer cache of the main memory to improve performance, it may be subject to significant influence by IO performance of the disk because all of the data blocks, redo logs, and undo logs have to be stored in the disk. Moreover, the disk-based relational database suffers from query execution delays in reading the data blocks due to the buffer cache whose size is relatively smaller than the disk.

Next, to explain the structure and property of the memory-based relational database, unlike the disk-based relational database, the memory-based relational database basically stores table data in a memory only and stores data with only a type of back-up image at specific point in the past and log data that has changed since then in a disk for recovery of the database provided for the server down.

Thus, when accessing the data in response to the query from the user, the data can be directly read-out from the memory table. Therefore, the memory-based relational database do not experience the disk I/O delay that reads the data block into the buffer cache that would otherwise occur in the disk-based database.

In other words, it is no longer necessary for the memory-based relational database to maintain the data in the form of blocks to optimize the reading and writing disks. Further, the memory-based database eliminates the need for keeping a undo log because it ensures a bulk reading in a way of creating the past version of the data in the memory in the row unit to be connected. In addition, since there is no lock overhead that was necessary to manage the structure of the block unit, the memory-based relational database enables an optimized processing of the query from the user.

Even for the DML to cause the change in the data, the memory-based relational database stores only the redo log data that contains the change. Thus, the memory-based database has many advantages in terms of saving of the disk capacity.

However, as set forth above, the memory-based relational database cannot be used as mass data storage for its memory size limitation.

Therefore, there has been a need for providing an optimization method for query statements and logical tables that is capable of realizing a high response speed while solving the problems of capacity limitation in the memory-based relational database by means of the extension of the horizontal partitioning method of a table in the database having a hybrid storage of disk and memory.

SUMMARY OF THE INVENTION

In view of the above, the present invention provides an apparatus and method for processing a query in a relational database system having a hybrid storage of a memory tablespace and a disk tablespace in which a table partitioning technology is extended in order to use the disk tablespace and memory tablespace in a hybrid manner, which is capable of implementing data discrimination due to different data storages in one logical table, creating scan plans in compliance with the difference in the storages to establish an optimal scan plan to the query intended to access the storages having different properties, and enabling an efficient use of a limited storage capacity while gaining a faster response to the query by providing a time-based partitioned table functionality of storing latest data in the memory tablespace and transferring in sequence old data that has passed a certain period of time into the disk tablespace.

In accordance with an aspect of the present invention, there is provided an apparatus for processing a query in a database system, the apparatus including: a tablespace metadata that stores information as to whether tables are stored in which tablespace, wherein the tables are stored in the database system including a disk tablespace and a memory tablespace; a query compiling unit, upon receiving a query statement, configured to check whether a table needed for processing the query statement is stored in the disk tablespace or the memory tablespace by referencing the information about the tablespace and to create a scan plan of the table; a query execution unit configured to read out the data of the table by accessing the disk tablespace or the memory tablespace in accordance with the scan plan that is created by the query compiling unit and to perform a processing of the query statement using the read-out data.

Further, the query execution unit may be configured to read out rows in the table in the form of a data block when it is checked that the table is stored in the disk tablespace; and read out rows in the table through memory pages when it is checked that the table is stored in the memory tablespace.

Further, the query execution unit may be configured to fit the storage structure of the rows that are read-out from the disk tablespace and the memory tablespace into the same format of the rows during performing the scan plan of the table.

Further, the query compiling unit may be configured to when the table is a non-partitioned table, check whether the table is stored in the disk tablespace or the memory tablespace; create a scan plan for a disk table full scan when it is checked that the table is stored in the disk tablespace; and create a scan plan for a memory table full scanning when it is checked that the table is stored in the memory tablespace.

Further, the query compiling unit may be configured to when creating the scan plan for disk table full scanning, check whether there is an index of the table; create a scan plan for a disk index scan when it is checked that there is an index of the table; and select either one of the disk table full scan plan and the disk index scan plan through the comparison of costs between them.

Further, the query compiling unit may be configured to when creating the scan plan for the memory table full scan, check whether there is an index of the table; create a scan plan for a memory index scan when it is checked that there is an index of the table; and select either one of the memory table full scan plan and the memory index scan plan through the comparison of costs between them.

Further, the query compiling unit may be configured to when the table is a partitioned table, check whether the partitioned tables are stored in a hybrid storage of the disk tablespace and the memory tablespace or the partitioned tables are stored either one of the disk tablespace and the memory tablespace; and create a scan plan for a hybrid full table scanning when it is checked that the partitioned table is stored in the hybrid storage.

Further, the query compiling unit may be configured to when creating the scan plan for a hybrid full table scan, check whether there is an index of the table; create a scan plan for a hybrid index scan when it is checked that there is an index of the table; and select either one of the hybrid full table scan plan and the hybrid index scan plan through the comparison of costs between them.

Further, the query compiling unit may be configured to create the scan plan that minimizes a cost required to process the query statement through the calculation of the cost necessary to read-out the table depending on the storage in which the table is stored.

Further, the table may be divided into a plurality of partitions and stored in either one of the disk tablespace and the memory tablespace; or the partitioned tables may be stored in a hybrid storage of the disk tablespace or the memory tablespace depending on the importance of a partition key value in the partitioned table.

Further, each of the partitioned tables may be transferred in sequence from the memory tablespace to the disk tablespace with the lapse of time pursuant according to the partition key value having time information in the partitioned table.

In accordance with another aspect of the present invention, there is provided method for processing a query in a database system including a hybrid storage of memory and disk tablespaces, the method including: receiving a query statement in the database system; upon receiving the query statement, checking whether a table needed for processing the query statement is stored in which storage by referencing information about the storage in which the table is stored; creating a scan plan of the table in compliance with the storage in which the table is stored; reading out data of the table by scanning the disk tablespace or the memory tablespace in accordance with the scan plan of the table; and performing a processing of the query statement using the read-out data.

Further, the reading out data of the table may include: reading out rows in the table in the form of a data block when it is checked that the table is stored in the disk tablespace; and reading out rows in the table through memory pages when it is checked that the table is stored in the memory tablespace.

Further, the creating a scan plan of the table may include: when the table is a non-partitioned table, checking whether the table is stored in the disk tablespace or the memory tablespace; creating a scan plan for a disk table full scan when it is checked that the table is stored in the disk tablespace; and creating a scan plan for a memory table full scanning when it is checked that the table is stored in the memory tablespace.

Further, the creating a scan plan for a disk table full scan may include: checking whether there is an index of the table; creating a scan plan for a disk index scan when it is checked that there is an index of the table; and selecting either one of the disk table full scan plan and the disk index scan plan through the comparison of costs between them.

Further, the creating a scan plan for a memory table full scan may include: checking whether there is an index of the table; create a scan plan for a memory index scan when it is checked that there is an index of the table; and selecting either one of the memory table full scan plan and the memory index scan plan through the comparison of costs between them.

Further, the creating a scan plan of the table may include: when the table is a partitioned table, checking whether the partitioned table is stored in a hybrid storage of the disk tablespace and the memory tablespace or the partitioned tables are stored either one of the disk tablespace and the memory tablespace; and creating a scan plan for a hybrid full scan when it is checked that the partitioned tables are stored in the hybrid storage.

Further, the creating a scan plan for a hybrid full scan may include: checking whether there is an index of the table; creating a scan plan for a hybrid index scan when it is checked that there is an index of the table; and selecting either one of the hybrid full table scan plan and the hybrid index scan plan through the comparison of costs between them.

Further, the table may be divided into a plurality of partitions and stored in either one of the disk tablespace and the memory tablespace; or the partitioned tables may be stored in a hybrid storage of the disk tablespace or the memory tablespace depending on the importance of a partition key value in the partitioned table.

Further, each of the partitioned tables may be transferred in sequence from the memory tablespace to the disk tablespace with the lapse of time pursuant to the partition key value having time information in the partitioned table.

With the configuration of exemplary embodiments of the present invention, by extending a table partitioning technology in order for the relational database system to use the disk tablespace and memory tablespace in a hybrid manner, it is possible to implement data discrimination due to different data storages in one logical table and create scan plans in compliance with the difference in the storages, thereby establishing an optimal scan plan to the query intended to access the storages having different properties.

It is also possible to overcome the limitation of storage capacity while gaining a faster response to the query with the help of providing a time-based partitioned table functionality of storing latest data in the memory tablespace and transferring in sequence old data that has passed a certain period of time into the disk tablespace.

BRIEF DESCRIPTION OF THE DRAWINGS

The above and other objects and features of the present invention will become apparent from the following description of the embodiments given in conjunction with the accompanying drawings, in which:

FIG. 3 illustrates a structure and data of a partitioned tables created using the same tablespace in accordance with an exemplary embodiment of the present invention;

FIGS. 4A to 4D illustrate a structure and data of a partitioned tables created using the different tablespaces in accordance with an exemplary embodiment of the present invention;

DETAILED DESCRIPTION OF THE EMBODIMENTS

Figure 1:
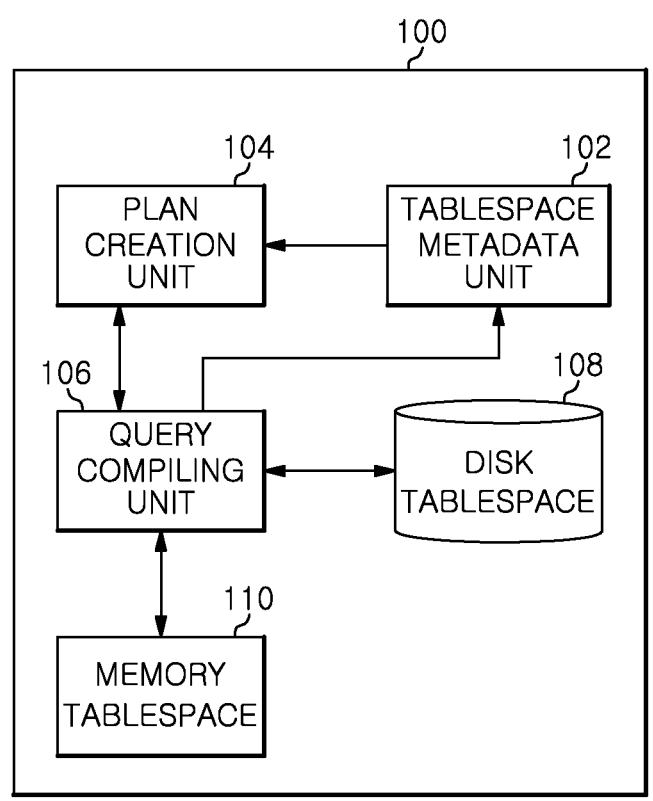
FIG. 1 is a detailed block diagram of an apparatus for processing queries for use in a database having hybrid storage in accordance with an exemplary embodiment of the present invention.

Hereinafter, the embodiments of the present invention will be described in detail with reference to the accompanying drawings. In the following description, well-known functions or constitutions will not be described in detail if they would obscure the subject matter of the present invention in unnecessary detail. Further, the terminologies to be described below are defined in consideration of functions in the present invention and may vary depending on intentions or practices of a user or an operator. Accordingly, the definition may be made on a basis of the content throughout the specification.

First of all, the following description will be made on a process of creating a table in a relational database that supports both a disk and memory tablespaces.

The following DDL statement is an example of a statement of creating disk-based tablespace.

CREATE TABLESPACE DISK_TBS datafile '/home/data/TBS.dtf' size 1G;

In the above DDL statement, a tablespace named DATA_TBS is generated as a storage space to store a file of '/home/data/TBS.dtf' on a real physical disk. If a new table based on the tablespace of DATA_TBS is created additionally and the table requires an additional storage space, a contiguous physical area of a fixed-size unit is assigned to the table from the data file. When data insertion, deletion, or change is made by a data change DML from a user, the change is stored in the disk and a data block for the change is read out from a relevant file upon receipt of a data accessing request by way of a query statement.

For instance, a disk-based table utilizing a disk tablespace can be created through the table creation statement as illustrated in the following EXAMPLE 1.

EXAMPLE 1

CREATE TABLE ORDERS (order_dt date,
order_no number,
cust_id number,
order_status number,
order_total number) TABLESPACE DISK_TBS;

Next, the following is an instance of a DDL statement to create a tablespace based on a memory:

CREATE MEMORY TABLESPACE MEMORY_TBS size 10G;

In the above DDL statement, a tablespace named as MEMORY_TBS is allocated with a memory size of 10G to initialize.

The memory tablespace utilized by the memory table is allocated with an additional storage space in the memory tables whenever the memory tables require the storage space. The memory table destined to utilize the memory tablespace may be a table having a similar behavior to the memory table that has been discussed with reference to the structure and property of the memory-based relational database. To put it another way, the memory-based relational database ensures an immediate memory access in accessing the table by the query statement and stores a redo log only in the disk even for the data change DML without storing the data in the disk.

As listed in the following EXAMPLE 2, for example, the tablespace is specified as a memory tablespace, thereby creating the memory table in a manner of the same as the table statement based on the disk.

EXAMPLE 2

---

CREATE TABLE CUSTOMER (cust_id number,
reg_dt date,
rank char(10),
address varchar(100),
name varchar (32)) TABLESPACE MEMORY_TBS;

---

In addition, whether the database is originated from either a disk-based database or a memory-based database does not be contained in table meta information within the database and is discriminated from the attribute of the tablespace in which the table is stored.

FIG. 1 is a detailed block diagram of an apparatus for processing queries for use in a database having a hybrid storage in accordance with an exemplary embodiment of the present invention. The query processing apparatus includes a tablespace metadata unit 102, a query compiling unit 104, a query execution unit 106, a disk tablespace 108, and a memory tablespace 110.

Hereinafter, the operation of the respective components of the query processing apparatus will be described with reference to FIG. 1.

First, the tablespace metadata unit 102 includes attribute information of the disk tablespace 108 or the memory tablespace 110, which stores tables, in a relational database system including both the disk tablespace 108 and the memory tablespace 110. Thus, the query compiling unit 104 may check in which storage data is stored by making a reference to the tablespace metadata unit 102.

The query compiling unit 104 builds up a table scan plan necessary for processing a query statement when receiving the query statement. When building the scan plan to access the table, the query compiling unit 104 refers to the tablespace metadata unit 102 to check the meta information indicating a tablespace in which the relevant table is stored and determines in which the disk tablespace 108 or the memory tablespace 110 the relevant table is stored. Further, the query compiling unit 104 creates a scan plan which minimizes the cost required to process the query statement through the calculation of the cost to read the relevant table depending on the storage in which the relevant table is stored, thereby achieving a table scan plan capable of optimally performing the query statement.

The query execution unit 106 recognizes the storage in which the relevant table is stored with the help of physical table information contained in the table scan plan created by the query compiling unit 104, and then reads out the data of the relevant table through the use of a function accessible to either the disk tablespace 108 or the memory tablespace 110 in which the relevant table is stored. Specifically, if it is recognized that the relevant table is stored in the disk tablespace 108, the relevant table is read out in the form of a data block. On the contrary, if it is recognized that the relevant table is stored in the memory tablespace 110, rows are obtained through memory pages. Since the rows may differ in their storage structures, they may be fitted into the same structure during the table scan. After performing the table scan, the query execution unit 106 performs a process of the statement, such as join, sort, etc., in a unit of row, based on the structure of the query statement from the user, where the processing may be carried out under assumption of the same structures for the respective rows.

Hereinafter, the operation of the query processing apparatus will be described by means of various queries.

First, the following EXAMPLE 3 represents a query to obtain the number of orders cancelled by a customer whose ID is 1234 and the total amount of orders using with a table ORDER on the disk and a table CUSTOMER on the memory that are created from the foregoing EXAMPLEs.

EXAMPLE 3

---

SELECT    count(order_no)    order_count,    sum(order_total) order_total
FROM CUSTOMER C, ORDERS O
WHERE C.cust_id = 1234 AND
    C.cust_id = O.cust_id AND
    O.order_status = 'CANCEL';

---

Figure 2:
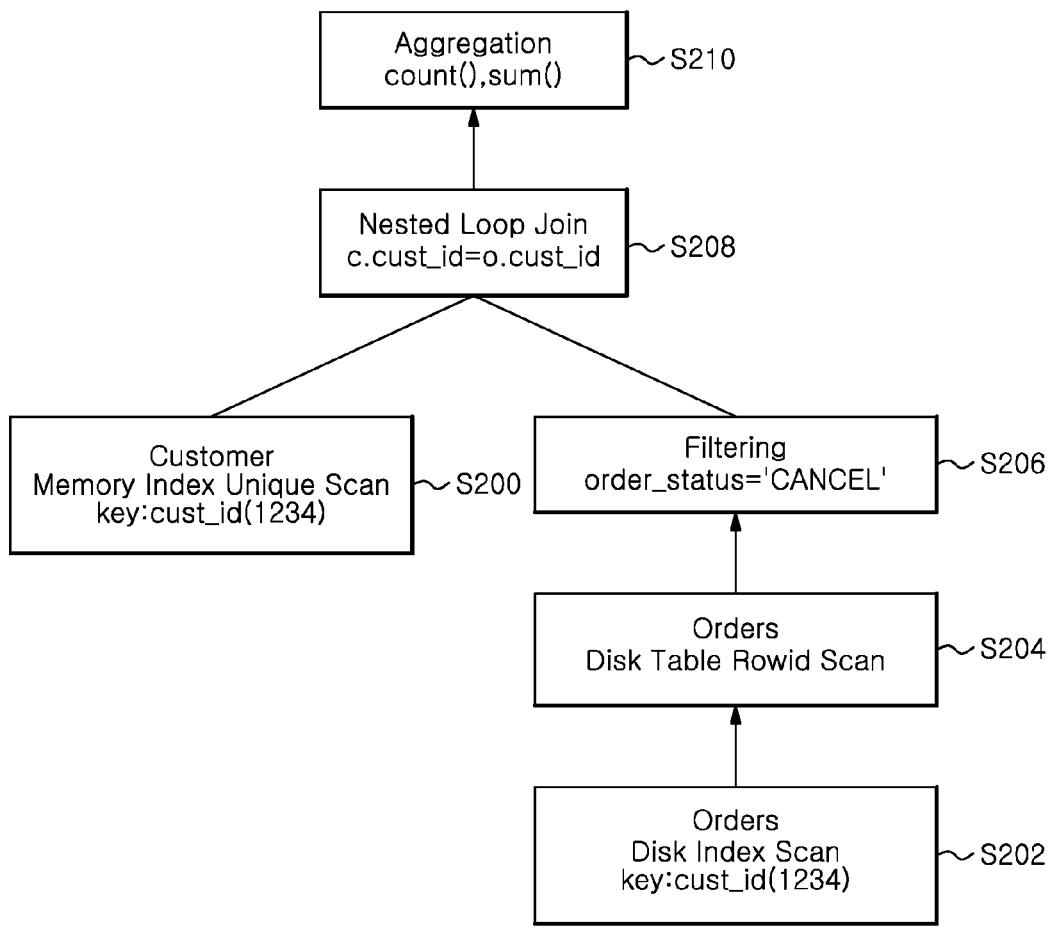
FIG. 2 is a conceptual diagram of creating a plan for a join query between a disk table and a memory table in accordance with an exemplary embodiment of the present invention.

FIG. 2 illustrates a performance plan of the above query producible from the query processing apparatus.

Referring to FIG. 2, in other words, an access plan to a table CUSTOMER on a single memory is produced as a plan to access an index and table that are stored in the memory tablespace 110 (Blocks S200).

Further, an access plan to the table ORDERS on the single disk is produced as a plan to get an access to the index and table that are stored in the disk tablespace 108 (Block S202) and a Rowid scan is performed on the table on the disk (Block S204). Thereafter, a search is made for the tables containing a customer id with the notation of order state information of 'cancel' through a filtering process (Block S206).

Next, two both tables are joined (Block S208), an aggregation is performed on the joined tables (Block S210). A transformation into a row type in the disk block will be performed after performing the memory access plan. Therefore, such a transformation is made without distinguishing the type of lows that are prepared in left or right when performing the nested loop join plan.

Next, the EXAMPLE 4 below is a DDL statement used to create a typical partitioned table.

EXAMPLE 4

---

CREATE TABLE ORDERS (order_dt date,
order_no number,
cust_id number,
order_status number,
order_total number)
    PARTITION BY RANGE (ORDER_DT) (
        PARTITION ORDERS_P1 VALUES LESS THAN
(TO_DATE('2013/01/01', 'YYYY/MM/DD') TABLESPACE DISK_TBS,
        PARTITION ORDERS_P2 VALUES LESS THAN
(TO_DATE('2013/02/01', 'YYYY/MM/DD') TABLESPACE DISK_TBS,
        PARTITION ORDERS_P3 VALUES LESS THAN
(MAXVALUE) TABLESPACE DISK_TBS
);

Referring to the above EXAMPLE 4 and the structure of the table shown in FIG. 3, there is shown the table ORDERS that stores data in total three partitioned tables by dividing the data in such a way that, with reference to a value of ORDER_DT column, the data prior to previous Jan. 1, 2013 is stored in ORDERS_P1 partition 300 of the partitioned table; the data up to Feb. 1, 2013 from Jan. 1, 2013 is stored in ORDERS_P2 partition 302; and the data up to Feb. 11, 2013 from Feb. 4, 2013 is stored in ORDERS_P3 partition 304.

On the other hand, generally, the partitioned tables that are created can be specified to be stored in different tablespaces. Thus, it is possible for a database that supports simultaneously the disk and memory tablespaces as described above to store the data of a non-partitioned table in separate storages with different physical attributes by specifying different tablespaces.

The EXAMPLE 5 below presents an instance of creating partitioned tables of a table CUSTOMER using the hybrid storage.

EXAMPLE 5

```
CREATE TABLE CUSTOMER (cust_id number,
reg_dt date,
rank char(10),
address varchar(100),
name varchar(32))
PARTITION BY LIST (rank)
(
    partition cust_p1 values ('VIP') TABLESPACE MEMORY_TBS,
    partition cust_p2 values ('GOLD') TABLESPACE DISK_TBS1,
    partition cust_p3 values ('SIVER') TABLESPACE DISK_TBS2,
    partition cust_p4 values (default) TABLESPACE DISK_TBS3
) ENABLE ROW MOVEMENT;
```

FIGS. 4A to 4D show a storage structure of the table CUSTOMER. As shown in FIGS. 4A to 4D, with reference to a value of rank columns of the table CUSTOMER, a memory table is configured in such a way of storing 'VIP' customer data in CUST_P1 400 of a partitioned table by specifying the tablespaces on the memory tablespace 110, and a disk table is configured in such a way of storing data within ranks other than that of the VIP customer in CUST_P2 402, CUST_P3 404, CUST_P4 406, and others by specifying the tablespace on the separate disk tablespace 108.

The EXAMPLE 6 below presents a query to yield purchase information for a particular customer for one month of November.

EXAMPLE 6

```
SELECT     count(order_no)     order_count,     sum(order_total) order_total
FROM CUSTOMER C, ORDERS O
WHERE C.cust_id = :B1 AND
    C.cust_id = O.cust_id AND
    O.order_dt between ('2013/11/01', '2013/11/30';
```

Figure 5:
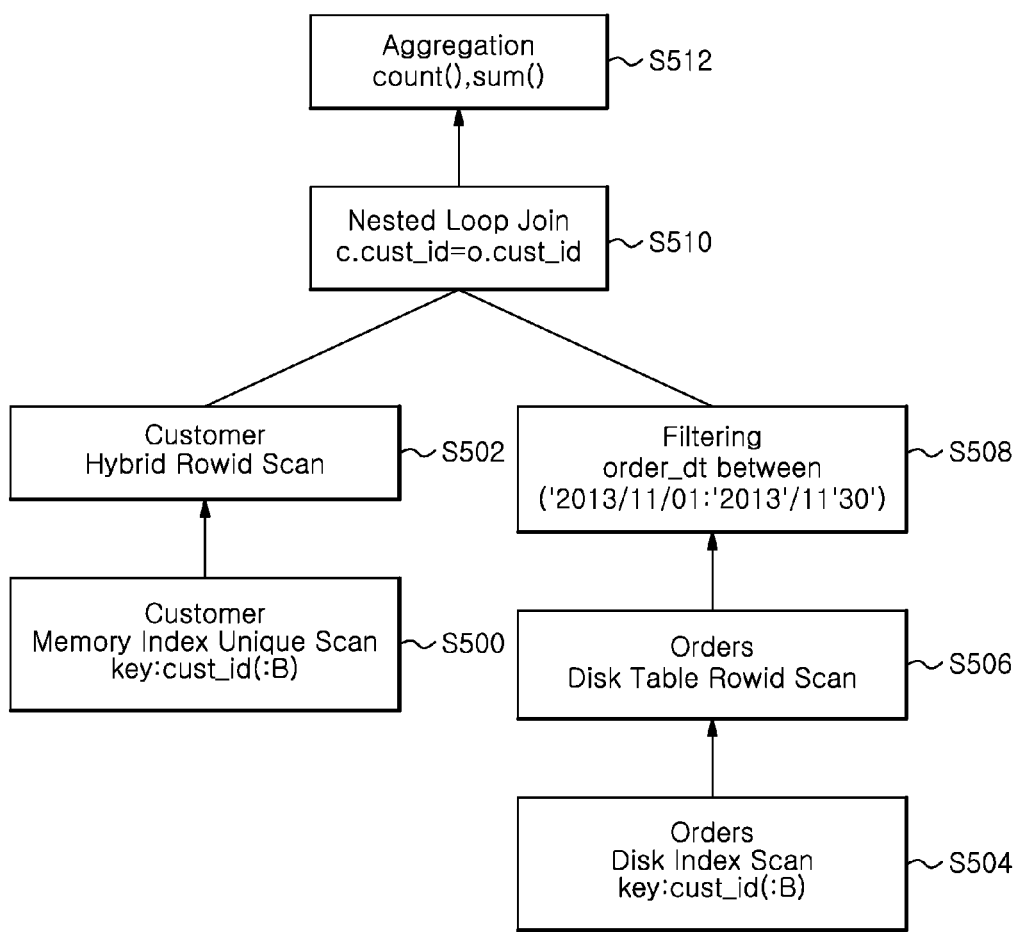
FIG. 5 is a conceptual diagram of an access to the tables stored in different disk and memory tablespaces at the time of executing a query in accordance with an exemplary embodiment of the present invention.

FIG. 5 shows a plan to perform the query of the above EXAMPLE 6.

In FIG. 5, it is assumed that the plan utilizes a global index produced in the table CUSTOMER on the disk.

a scan plan for the table CUSTOMER on the memory creates a plan to access an index and table that are stored in the memory tablespace 110 (Block 500) and performs a Hybrid Rowid scan on the table in the memory (Block S502).

Further, a scan plan for the table CUSTOMER on the disk creates a plan to an access index and table that are stored in the disk tablespace 108 (Block 504) and performs a Rowid scan on the table on the disk (Block S506).

Thereafter, a search is made for the tables containing the user id with the notation of the order date of November through a filtering process (Block S508). Next, two tables are joined (Block S510) and an aggregation is performed on the joined tables (Block S512).

That is, when getting a Rowid as an index after acquiring a value of a unique ID from the user to be inquired, it is possible to determine through the Rowid whether the data for the user is stored in the disk table or in the memory table. In the case where a customer has a ranking of 'VIP' and thus it is allowed to access the memory table, a direct access to the memory table can be achieved without reading a disk block in contrast with other customers having rank other than the 'VIP', which results in obtaining more high response.

In this regard, since an access way to the table may vary depending on the rowid at an execution time by the query execution unit 106 in the query processing apparatus, the query processing apparatus needs to create a plan for making the selection of the access way through the determination at the execution point by the query processing unit 106. The plan to do such selection is represented as 'Hybrid Rowid Scan' node in FIG. 5. The kind of the nodes to select and execute the access way are as follows.

Hybrid Full Table scan
Hybrid Rowid scan
Hybrid Local Index scan

Figure 6A:
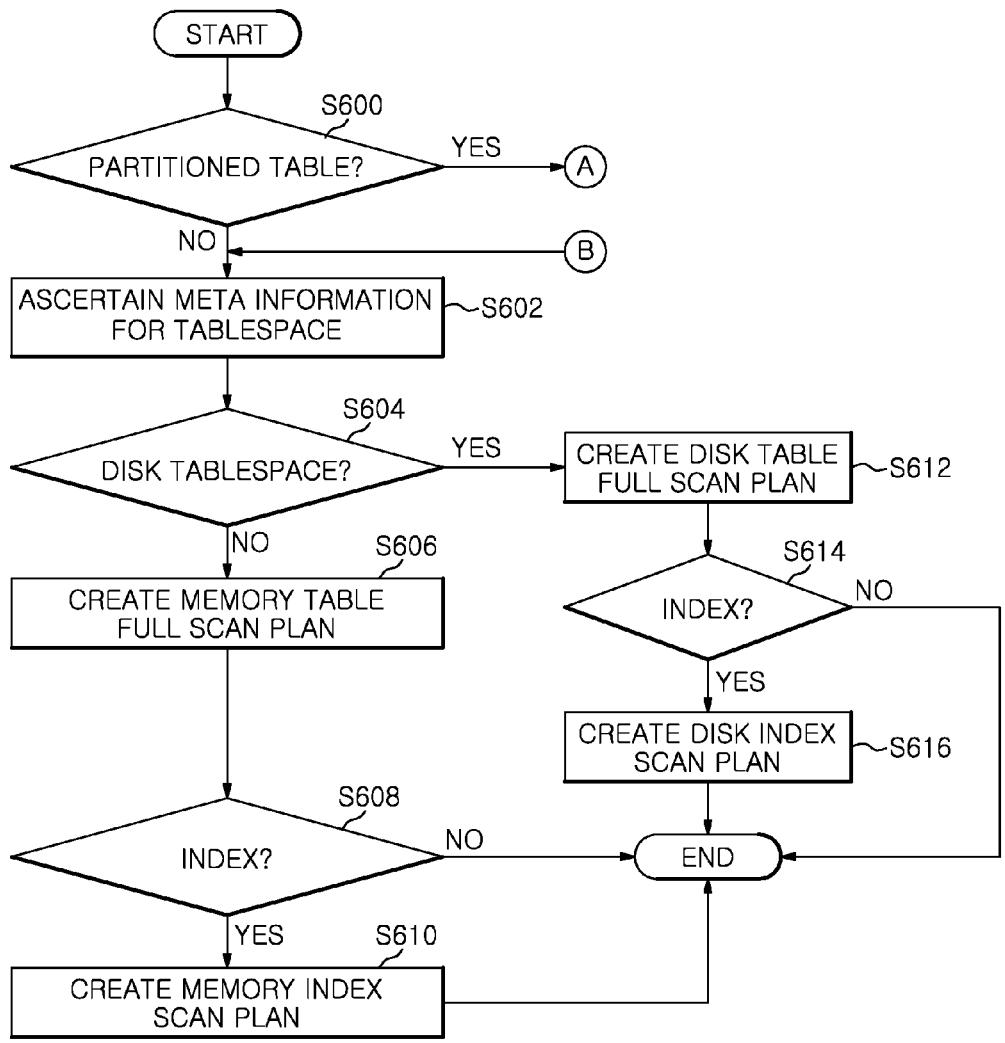
FIGS. 6A and 6B are a flow chart of a method for creating a plan to access a non-partitioned table or a partitioned table based on the property of the tablespaces in accordance with an exemplary embodiment of the present invention.
Figure 6B:
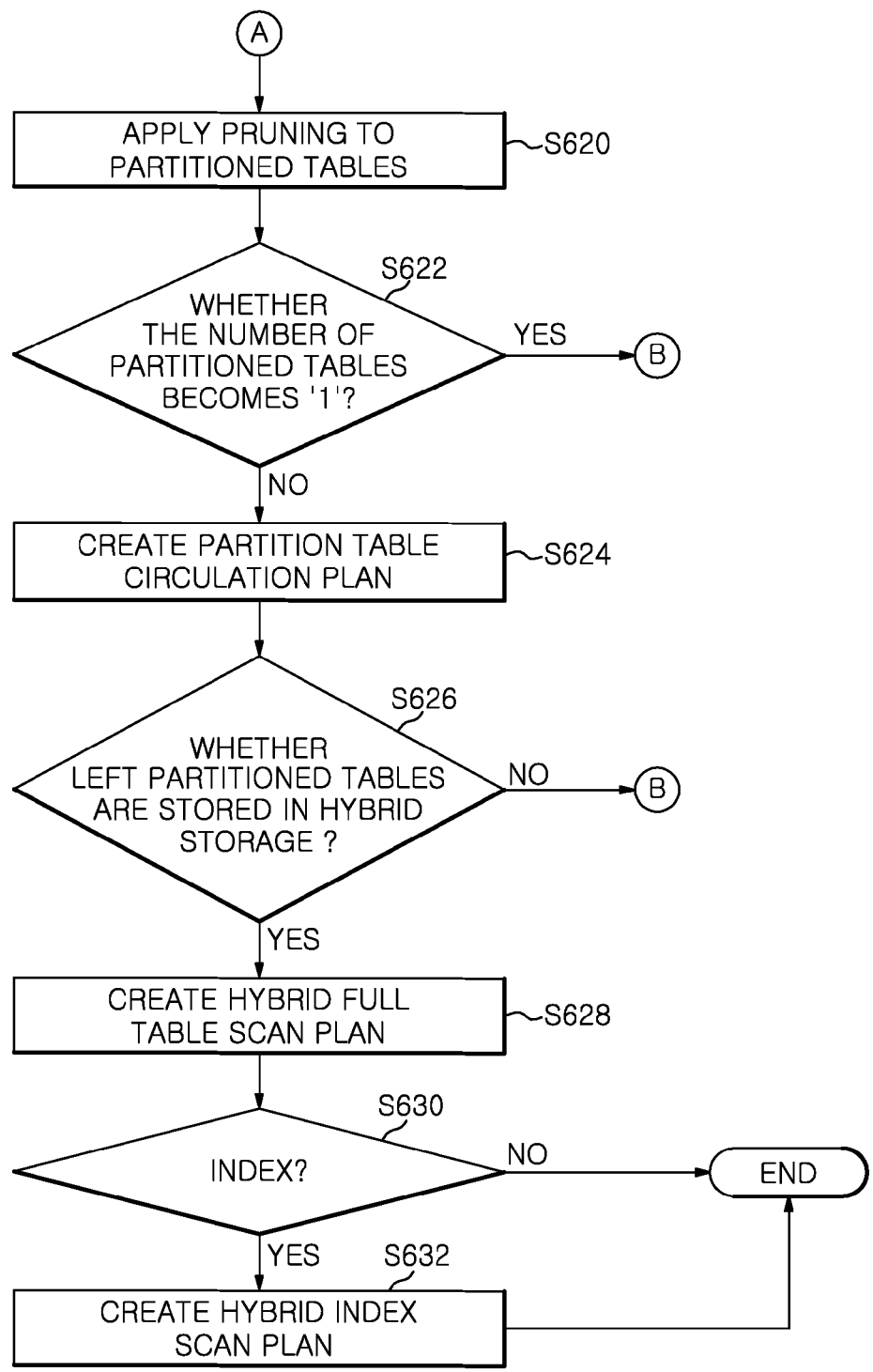

FIGS. 6A and 6B are a flow chart illustrating a method of creating a table scan plan to process a query statement in the query processing apparatus in the relational database system including a hybrid storage in accordance with an exemplary embodiment of the present invention. Hereinafter, the exemplary embodiment of the present invention will be described in detail with reference to FIG. 1 to FIGS. 6A and 6B.

First, as shown in FIG. 6A, the query statement is entered into the relational database system including the hybrid storage of memories and disks. The query statement may be any one of a request for a table that is stored in the disk tablespace 108; a request for a table stored in the memory tablespace 110; and a request for a table that is divided into and separately stored in both the disk tablespace 108 and the memory tablespace 110 wherein the table may be a partitioned table or a non-partitioned table.

Therefore, the query processing apparatus 100 of the relational database system including the hybrid storage of memories and disks establishes an optimization table scan plan for the query statement by means of the extension of the table partitioning method that enables the use of the hybrid storage of the memory tablespace 110 and the disk tablespace 108.

More specifically, when the query statement is entered from the user, the query processing unit 100 checks whether the table needed for processing the query statement is a non-partitioned table or a partitioned table (Block S600).

If the table needed for processing the query statement is the non-partitioned table, then the query processing device 100 identifies the tablespace meta information stored in the tablespace metadata unit 102 and checks whether the storage having the table stored therein is the disk tablespace 108 or the memory tablespace 110 (Block S602).

Then, if the storage having the table stored therein is determined as the memory tablespace 110 from the check result at Block S604, then the method goes to Block S606 where the query processing apparatus 100 creates a scan plan for a memory table full scan.

After creating the memory table full scan plan as described above, the query processing apparatus 100 checks whether or not there is an index (Block S608).

If there is no index, then the query processing apparatus 100 processes the query statement with the memory table full scan plan. However, if there is an index, then the query processing apparatus 100 also creates a scan plan for a memory index scan. Thereafter, the query processing apparatus 100 processes the query statement with either one of the memory table full scan plan and the memory index scan plan, which is selected by a comparison of costs between them (Block S610).

However, if the storage having the table stored therein is determined as the disk tablespace 108 from the check result results at Block S604, the method advances to Block S612 where the query processing apparatus 100 creates a scan plan for a disk table full scan.

After creating the disk table full scan plan as described above, the query processing apparatus 100 checks whether or not there is an index (Block S614).

If there is no index, then the query processing apparatus 100 processes the query statement with the disk table full scan plan. However, if there is an index, the query processing apparatus 100 also creates a scan plan for a disk index scan. Thereafter, the query processing apparatus 100 processes the query statement with either one of the disk table full scan plan and the disk index scan plan, which is selected by a comparison of costs between them (Block S616).

Meanwhile, if the table needed for processing the query statement is a partitioned table, then the method goes to Block S620 as shown in FIG. 6B through a tab 'A' where the query processing device 100 applies the pruning to the partitioned table.

Subsequently, the query processing apparatus 100 counts the number of the partitioned tables that are left after being subject to the pruning and then checks whether the number of the partitioned tables becomes 'one' (Block S622).

If it is checked that the number of the partitioned tables becomes 'one', then the method returns to Block S602 through a tab 'B' to repeatedly perform the processing of the query statement as described in Blocks S206 to S616.

If, however, one or more partitioned tables are left after the pruning, the query processing apparatus 100 creates a partitioned table circulation plan with respect to the left partitioned tables (Block S624) and checks whether the left partitioned tables are stored in the hybrid storage of both the disk tablespace 108 and the memory tablespace 110 (Block S626).

If it is checked that the partitioned tables left more than one are stored in only one of the disk tablespace 108 and the memory tablespace 110, then the method returns to Block S602 through a tab 'B' to repeatedly perform the processing of the query statement as described in Blocks S206 to S616.

However, if it is checked that the partitioned tables left more than one are stored in the hybrid storage of both the disk tablespace 108 and the memory tablespace 110, then the query processing apparatus 100 creates a hybrid full table scan plan (Block S628).

After creating the hybrid full scan plan, the query processing apparatus 100 checks whether there is an index (Block S630).

If there is no index, then the query processing apparatus 100 processes the query statement with the hybrid full table scan plan, whereas if there is an index, then the query processing apparatus 100 also creates a scan plan for a hybrid local table scan. Thereafter, the query processing apparatus 100 processes the query statement with either one of the hybrid full table scan plan and the hybrid local index scan plan, which is selected by the cost comparison between them (Block S632).

The task performed in 'applying the pruning to the partitioned table' as used in Block S620 of FIG. 6B refers to a process of calculating a partitioned table to be accessed at the time of creating the scan plan in the case where IF statement is present in a value of a reference column of the partitioned table. For example, when there is an IF statement such as C.rank='VIP' in the foregoing query, the query processing apparatus 100 determines to be allowed to access only a partitioned table CUST_P1 including data corresponding to C.rank='VIP'. After passing through the pruning, the plan of the query relevant to the partitioned table can be created, like as the query relevant to the non-partitioned table.

Moreover, the embodiment of the present invention provides a functionality of automatically transferring the partitioned table having data therein from the memory tablespace to the disk tablespace in sequence with the course of time by help of the technology of creating the partitioned tables.

The following EXAMPLE 7 depicts a DDL statement transferring in sequence the partitioned table from the memory tablespace to the disk tablespace in the relational database system including a hybrid storage of memories and disks.

EXAMPLE 7

```
CREATE TABLE ORDERS (order_dt date,
order_no number,
cust_id number,
order_status number,
order_total number)
PARTITION BY TIMELINE (order_dt) AGING INTERVAL '10 minute'
(
    PARTITION orders_p1 VALUES WITHIN interval '1 day'
TABLESPACE MEMORY_TBS,
    PARTITION orders_p2 VALUES WITHIN interval '7 day'
TABLESPACE DISK_TBS1,
PARTITION orders_p3 VALUES WITHIN MAXVALUE
    TABLESPACE DISK_TBS2
) ENABLE ROW MOVEMENT;
```

As illustrated in the above EXAMPLE 7, when data is newly added in the partitioned table, the insertion process is made through the procedure of selecting a PARTITION by comparing a value of (SYSDATE-order_dt) and a reference interval value of each PARTITION.

Further, the data storages may vary with the course of time; therefore, the data in the respective partitioned tables is transferred at a period of '10 minutes' intervals that is specified in the aforementioned DDL statement. Such a periodic transferring job may be registered during the process of the DDL statement for table creation in a job management system in the relational database system to continue the transferring job of the partitioned tables.

The table partitioning technology enables the discrimination of the storages to store data with the lapse of time.

Accordingly, it is possible to provide a more high response to the user query as for latest data and to enable an efficient use of limited memory tablespace by an automatic transferring of old data that is considered to be less important to other tablespaces.

As set forth above, the embodiment of the present invention extends a table partitioning technology in order for the relational database system to use the disk tablespace and memory tablespace in a hybrid manner, thereby implementing data discrimination due to different data storages in one logical table, and create scan plans in compliance with the difference in the storages, thereby establishing an optimal scan plan to the query intended to access the storages having different properties. Further, the embodiment of the present invention provides a time-based partitioned table functionality of storing latest data in the memory tablespace and transferring in sequence old data that has passed a certain period of time into the disk tablespace, thereby overcoming the limitation of storage capacity while gaining a faster response to the query.

While the description of the present invention has been made to the exemplary embodiments, various changes and modifications may be made without departing from the scope of the present invention. The embodiment of the present invention is not limited thereto. Therefore, the scope of the present invention should be defined by the appended claims rather than by the foregoing embodiments.

What is claimed is:

1. An apparatus for processing a query in a database system, the apparatus comprising:
   a processor including:
   a tablespace metadata that stores information as to whether tables are stored in which tablespace, wherein the tables are stored in the database system including a disk tablespace and a memory tablespace;
   a query compiling unit, upon receiving a query statement, configured to:
   check whether a table needed for processing the query statement is stored in the disk tablespace or the memory tablespace by referencing the information about the tablespace;
   create a scan plan for a disk table full scan when it is checked that the table is stored in the disk tablespace;
   create a scan plan for a memory table full scanning when it is checked that the table is stored in the memory tablespace;
   create a scan plan for a hybrid full table scanning when the table is a partitioned table and it is checked that the partitioned table is stored in a hybrid storage of the disk tablespace and the memory tablespace; and
   a query execution unit configured to:
   read out the data of the table by accessing the disk tablespace or the memory tablespace in accordance with the scan plan that is created by the query compiling unit and to perform a processing of the query statement using the read-out data;
   read out rows in the table in the form of a data block when it is checked that the table is stored in the disk tablespace;
   read out rows in the table through memory pages when it is checked that the table is stored in the memory tablespace;
   fit the storage structure of the rows that are read-out from the disk tablespace and the memory tablespace into the same format of the rows during performing the scan plan of the table,
   wherein, when the table is the partitioned table the table is divided into a plurality of partitions and stored in either one of the disk tablespace and the memory tablespace, or the partitioned tables are stored in the hybrid storage of the disk tablespace or the memory tablespace depending on the importance of a partition key value in the partitioned table, and each of the partitioned tables is transferred in sequence from the memory tablespace to the disk tablespace with the lapse of time pursuant to the partition key value having time information in the partitioned table.

2. The apparatus of claim 1, wherein the query compiling unit is further configured to:
   when creating the scan plan for disk table full scanning, check whether there is an index of the table;
   create a scan plan for a disk index scan when it is checked that there is an index of the table; and
   select either one of the disk table full scan plan and the disk index scan plan through the comparison of costs between them.

3. The apparatus of claim 1, wherein the query compiling unit is further configured to:
   when creating the scan plan for the memory table full scan, check whether there is an index of the table;
   create a scan plan for a memory index scan when it is checked that there is an index of the table; and
   select either one of the memory table full scan plan and the memory index scan plan through the comparison of costs between them.

4. The apparatus of claim 1, wherein the query compiling unit is configured to:
   when the table is a partitioned table, check whether the partitioned tables are stored in a hybrid storage of the disk tablespace and the memory tablespace or the partitioned tables are stored either one of the disk tablespace and the memory tablespace; and
   create a scan plan for a hybrid full table scanning when it is checked that the partitioned table is stored in the hybrid storage.

5. The apparatus of claim 4, wherein the query compiling unit is further configured to:
   when creating the scan plan for a hybrid full table scan, check whether there is an index of the table;
   create a scan plan for a hybrid index scan when it is checked that there is an index of the table; and
   select either one of the hybrid full table scan plan and the hybrid index scan plan through the comparison of costs between them.

6. The apparatus of claim 1, wherein the query compiling unit is configured to create the scan plan that minimizes a cost required to process the query statement through the calculation of the cost necessary to read-out the table depending on the storage in which the table is stored.

7. A method for processing a query in a database system including a hybrid storage of a memory tablespace and a disk tablespace, the method comprising:
   receiving a query statement in the database system;
   upon receiving the query statement, checking whether a table needed for processing the query statement is stored in which storage by referencing information about the storage in which the table is stored;
   creating a scan plan of the table in compliance with the storage in which the table is stored, the creating scan plan of the table comprising:

creating a scan plan for a disk table full scan when it is checked that the table is stored in the disk tablespace;
creating a scan plan for a memory table full scanning when it is checked that the table is stored in the memory tablespace; and
creating a scan plan for a hybrid full table scanning when the table is a partitioned table and it is checked that the partitioned table is stored in a hybrid storage of the disk tablespace and the memory tablespace;
reading out data of the table by scanning the disk tablespace or the memory tablespace in accordance with the scan plan of the table, the reading out data of the table comprising:
reading out rows in the table in the form of a data block when it is checked that the table is stored in the disk tablespace; and
reading out rows in the table through memory pages when it is checked that the table is stored in the memory tablespace; and
performing a processing of the query statement using the read-out data,
wherein, when the table is the partitioned table the table is divided into a plurality of partitions and stored in either one of the disk tablespace and the memory tablespace, or the partitioned tables are stored in a hybrid storage of the disk tablespace or the memory tablespace depending on the importance of a partition key value in the partitioned table, and
wherein each of the partitioned tables is transferred in sequence from the memory tablespace to the disk tablespace with the lapse of time pursuant to the partition key value having time information in the partitioned table.

8. The method of claim 7, wherein said creating a scan plan for a disk table full scan further comprises:
checking whether there is an index of the table;
creating a scan plan for a disk index scan when it is checked that there is an index of the table; and
selecting either one of the disk table full scan plan and the disk index scan plan through the comparison of costs between them.

9. The method of claim 7, wherein said creating a scan plan for a memory table full scan further comprises:
checking whether there is an index of the table;
creating a scan plan for a memory index scan when it is checked that there is an index of the table; and
selecting either one of the memory table full scan plan and the memory index scan plan through the comparison of costs between them.

10. The method of claim 7, wherein said creating a scan plan of the table further comprises:
when the table is a partitioned table, checking whether the partitioned table is stored in a hybrid storage of the disk tablespace and the memory tablespace or the partitioned tables are stored either one of the disk tablespace and the memory tablespace; and
creating a scan plan for a hybrid full scan when it is checked that the partitioned tables are stored in the hybrid storage.

11. The method of claim 10, wherein said creating a scan plan for a hybrid full scan further comprises:
checking whether there is an index of the table;
creating a scan plan for a hybrid index scan when it is checked that there is an index of the table; and
selecting either one of the hybrid full table scan plan and the hybrid index scan plan through the comparison of costs between them.

\* \* \* \* \*